United States Patent
Biton

(10) Patent No.: US 11,330,095 B2
(45) Date of Patent: May 10, 2022

(54) EMERGENCY KIT

(71) Applicant: Yossef Biton, Ashdod (IL)

(72) Inventor: Yossef Biton, Ashdod (IL)

( * ) Notice: Subject to any disclaimer, the term of this patent is extended or adjusted under 35 U.S.C. 154(b) by 0 days.

(21) Appl. No.: 15/734,566

(22) PCT Filed: Jun. 17, 2019

(86) PCT No.: PCT/IL2019/050677
§ 371 (c)(1),
(2) Date: Dec. 3, 2020

(87) PCT Pub. No.: WO2019/244149
PCT Pub. Date: Dec. 26, 2019

(65) Prior Publication Data
US 2021/0337060 A1 Oct. 28, 2021

(30) Foreign Application Priority Data

Jun. 19, 2018 (IL) .......................................... 260161

(51) Int. Cl.
| | |
|---|---|
| *H04M 1/72421* | (2021.01) |
| *G08B 27/00* | (2006.01) |
| *H04W 4/90* | (2018.01) |
| *H04M 1/72412* | (2021.01) |
| *H04M 11/02* | (2006.01) |
| *H04M 11/04* | (2006.01) |
| *H04W 4/021* | (2018.01) |
| *H04M 1/72469* | (2021.01) |
| *G06F 3/0482* | (2013.01) |

(52) U.S. Cl.
CPC ... *H04M 1/72421* (2021.01); *H04M 1/72412* (2021.01); *H04M 11/025* (2013.01); *H04M 11/04* (2013.01); *H04W 4/021* (2013.01); *H04W 4/90* (2018.02); *G06F 3/0482* (2013.01); *H04M 1/72469* (2021.01)

(58) Field of Classification Search
CPC ......... H04M 1/72421; H04M 1/72412; H04M 1/72469; H04M 11/04; H04M 11/025; H04W 4/90; H04W 4/021; G06F 3/0482
See application file for complete search history.

(56) References Cited

U.S. PATENT DOCUMENTS

| | | | | |
|---|---|---|---|---|
| 5,636,263 | A | * | 6/1997 | Thomson ............... H04M 11/04 340/539.18 |
| 5,903,216 | A | * | 5/1999 | Sutsos ................ G07C 9/00182 340/542 |
| 2003/0086539 | A1 | | 5/2003 | McCalmont et al. |
| 2005/0143048 | A1 | * | 6/2005 | Binning ................. H04L 12/66 455/404.2 |
| 2006/0154642 | A1 | | 7/2006 | Scannell, Jr. |
| 2009/0248828 | A1 | | 10/2009 | Gould et al. |
| 2010/0146426 | A1 | * | 6/2010 | Parkulo ................. G01S 13/878 715/769 |
| 2016/0014475 | A1 | | 1/2016 | Russell et al. |

* cited by examiner

*Primary Examiner* — Farid Seyedvosoghi

(57) ABSTRACT

An emergency kit (10A), including an apparatus (38A) including: a long-range communication device including a unique identity module (30A), for receiving (24) a status of the apparatus (38A) from another long-range communication device (26B); and a visual/vocal/transmitting device (16A), for being turned on once the status is active, thereby the apparatus (38A) indicates a first location of an emergency event setting the active status.

14 Claims, 8 Drawing Sheets

EMERGENCY KIT

RELATED APPLICATION/S

This application is a National Phase of PCT Patent Application No. PCT/2019IL50677 having International filing date of 17 Jun. 2017, which claims the benefit of priority of Israeli Patent Application No. 260161 filed 19 Jun. 2018. The contents of the above applications are all incorporated herein by reference.

TECHNICAL FIELD

The invention in some embodiments thereof relates to the field of emergency medical service and other emergency services.

BACKGROUND

In case of emergency, when every second matters, there is sometimes a great difficulty to locate the exact address: building number, or specific entrance.

As a result, a lot of time is wasted in locating the right building. Sometimes, a parking gate or entrance of main door are locked, therefore emergency teams often lose the "golden minutes" (critic minutes for life saving).

There is a long felt need to provide a solution to the above-mentioned and other problems of the prior art.

SUMMARY

According to an aspect of some embodiments of the invention, there is provided an emergency kit (10A), including a first apparatus (38A) including: a long-range communication device including a unique identity module (30A), for receiving (24) a status of the first apparatus (38A) from another long-range communication device (26B); and a first member (16A), including at least one member selected from a group consisting of a visual, vocal and transmitting device, for being turned on once the status is active, thereby the first apparatus (38A) indicates a first location of an emergency event setting the status to active.

According to some embodiments of the invention, the emergency kit (10A) further includes a second apparatus (34A), including: a first short-range transceiver (32B1), for receiving the status from the first apparatus (38A); and a second member (16B1), including at least one member selected from a group consisting of a visual, vocal and transmitting device, for being turned on once the status is active, thereby the second apparatus (34A) indicates a second location of the emergency event, being improved in relation to the first location.

According to some embodiments of the invention, the emergency kit (10A) further includes at least a third apparatus (34B), including: a second short-range transceiver (32B2), for receiving the status from any of the apparatuses (38A, 34A); and a third member (16B2), including at least one member selected from a group consisting of a visual, vocal and transmitting device, for being turned on once the status is active, thereby the at least third apparatus (34B) indicates at least a third location of the emergency event, being improved in relation to any of the locations.

According to some embodiments of the invention, the first apparatus (38A) further includes: a third short-range transceiver (32A), for receiving the status from the unique identity module (30A), for transmitting the status to other apparatuses (34A).

According to some embodiments of the invention, the transmitting device is configured to open (18) a gate.

According to an aspect of some embodiments of the invention, there is provided an emergency notification system including: a network communication device including a caller application configured for opening when a call is made on the network communication device to an emergency number, automatically activating at least one emergency notification devices facilitating access of an emergency responder to a location of an emergency event.

According to some embodiments of the invention, the caller application is configured to configured for activating the at least one emergency notification devices facilitating access of an emergency responder to a location of the network communication device.

According to some embodiments of the invention, the caller application is further configured for displaying on the caller network communication device a menu of control options for a plurality of the emergency notification devices.

According to some embodiments of the invention, the system further includes: a responder communication device configured to open a responder application coordinated to the caller application for displaying on the responder communication device an indicator of a status of the plurality of the emergency notification devices.

According to some embodiments of the invention, the responder application is further configured for displaying on the responder communication device a menu of control options for a plurality of the emergency notification devices.

According to some embodiments of the invention, the caller application is further configured for presenting a menu for verifying a location of an emergency event.

According to some embodiments of the invention, the system further includes: a responder communication device configured to open a responder application coordinated to the caller application for displaying on the responder communication device an indicator of a status of the verification.

According to some embodiments of the invention, the caller application is further configured for presenting a menu for verifying a location of an emergency event.

According to some embodiments of the invention, the system further includes: a responder communication device configured to open a responder application coordinated to the caller application for displaying on the responder communication device an indicator of a status of the verification.

According to an aspect of some embodiments of the invention, there is provided a method of coordinating emergency information including: calling an emergency number on a network communication device; opening a caller application on the network communication; controlling an emergency notification apparatus via the caller application.

According to some embodiments of the invention, the method further includes: the emergency notification apparatus performing at least one of indicating an entrance to a building and opening a gate.

According to some embodiments of the invention, the controlling is over a public network.

According to some embodiments of the invention, the controlling includes sending a command from the caller application over a public network to the emergency notification apparatus.

According to some embodiments of the invention, the method further includes: opening a responder application on a network communication device of an emergency responder; coordinating the responder application with the caller application over a network; and indicating a status of the emergency notification apparatus on the responder device.

According to some embodiments of the invention, the method further includes: controlling an emergency notification apparatus via the responder application.

According to some embodiments of the invention, the method further includes the caller application presenting a menu for verifying a location of an emergency event and the responder application coordinated to the caller application for displaying on the responder communication device an indicator of a status of the verification.

According to some embodiments of the invention, the method further includes the caller application sending a sensor output from the network communication device to the responder device and the responder application displaying the sensor output to the responder.

According to an aspect of some embodiments of the invention, there is provided an emergency kit, including:
- a long-range communication device including a unique identity module; and
- a visual/vocal/transmitting device, for being turned on once the status is active, thereby the apparatus indicates a first location of an emergency event setting the active status.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks might be expected to use completely different methods, e.g., making use of expert knowledge and/or the pattern recognition capabilities of the human brain, which would be vastly more efficient than manually going through the steps of the methods described herein.

Data and/or program code may be accessed and/or shared over a network, for example the Internet. For example, data may be shared and/or accessed using a social network. A processor may include remote processing capabilities for example available over a network (e.g. the Internet). For example, resources may be accessed via cloud computing. The term "cloud computing" refers to the use of computational resources that are available remotely over a public network, such as the internet, and that may be provided for example at a low cost and/or on an hourly basis. Any virtual or physical computer that is in electronic communication with such a public network could potentially be available as a computational resource. To provide computational resources via the cloud network on a secure basis, computers that access the cloud network may employ standard security encryption protocols such as SSL and PGP, which are well known in the industry.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Figure 1:
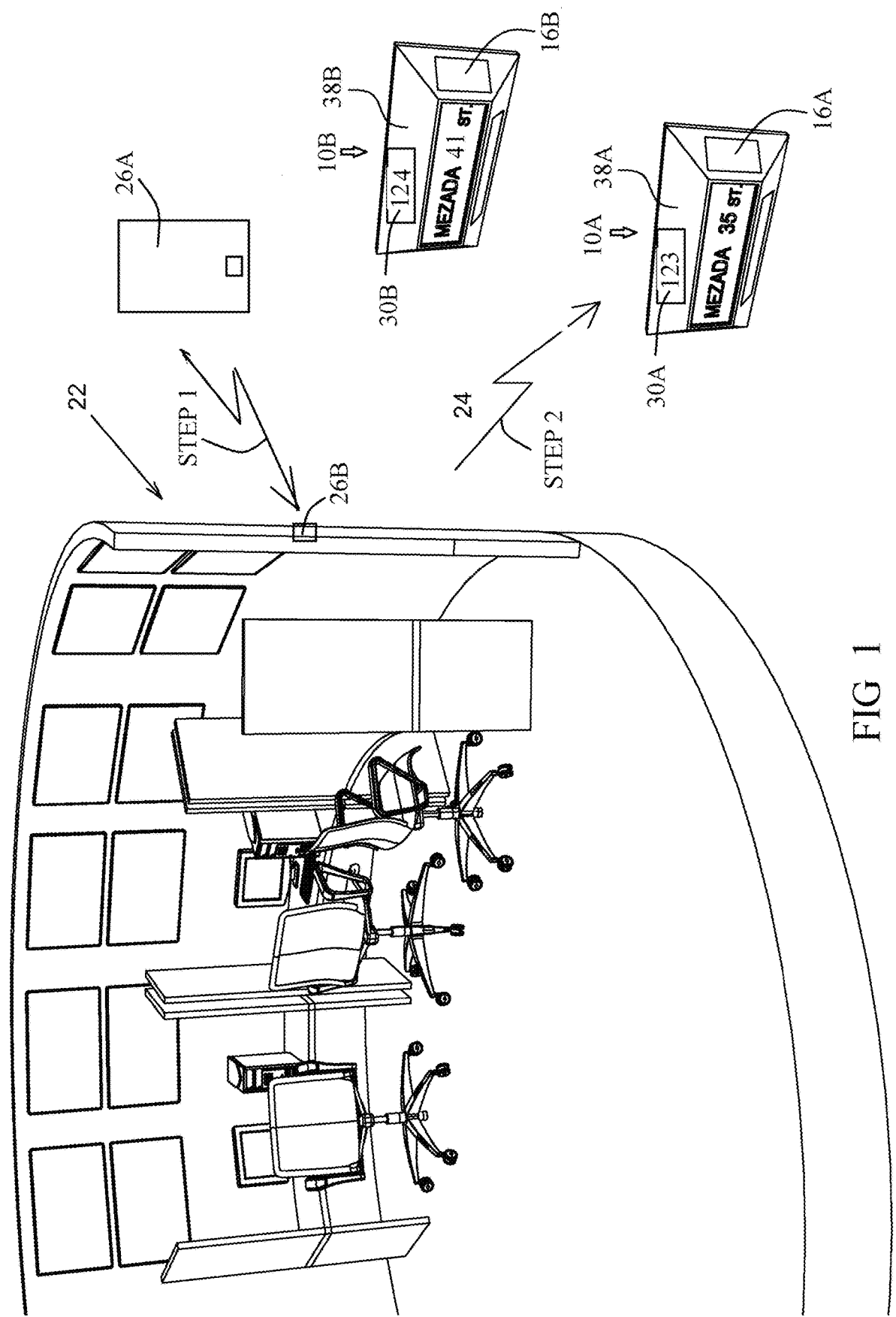
FIG. 1 depicts the first steps of using the emergency apparatus according to an embodiment of the current invention.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Overview

An aspect of some embodiments of the current invention relates an emergency notification system. For example, the system may include a notification apparatus. For example, the notification apparatus may include a main apparatus having a network communication capability for remote control. For example, the notification apparatus may include a secondary apparatus configured for being controlled by the main apparatus. The main apparatus and/or the secondary apparatus may include an entrance marker and/or a gate opening device for a building.

An aspect of some embodiments of the current invention relates to an application for coordinating information and/or control of a notification apparatus between a caller reporting an emergency and/or other people for example include an emergency responder and/or a dispatcher. The application may present menus to a user for verifying data and/or controlling a notification apparatus. Optionally the data and/or control are coordinated between the responder, the caller, a dispatcher, a building superintendent, a caretaker and/or security personnel.

Specific Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 depicts the first steps of using the emergency apparatus according to one embodiment of the invention.

An emergency kit 10A according to one embodiment of the invention, includes a primary apparatus 38A, including a subscriber identity module (SIM card) 30A including a long-range communication device, for receiving an emergency event report 24 from the headquarters 22.

At the first step, a mobile phone 26A of a person reporting the event, requesting an ambulance service, reports the identification of primary apparatus 38A. The identification of primary apparatus 38A may correspond to the unique dialing number of its SIM card 30A, being in the example "123".

In some embodiments, the identification of one or more primary apparatuses are stored in the memory of the reporting caller's communication device. For example, a user's home device (e.g. a home phone and/or personal computer) may automatically send the identification of an apparatus 38A associated with an apartment when an emergency call is made on the home device. Alternatively or additionally, a cell phone of the user may include a stored identification number of apparatus 38A which is automatically sent when an emergency call is made. Alternatively or additionally, the cell phone may check its current location and/or send an identification of an emergency notification e.g. of one or another apparatus appropriate to the current location.

Figure 2:
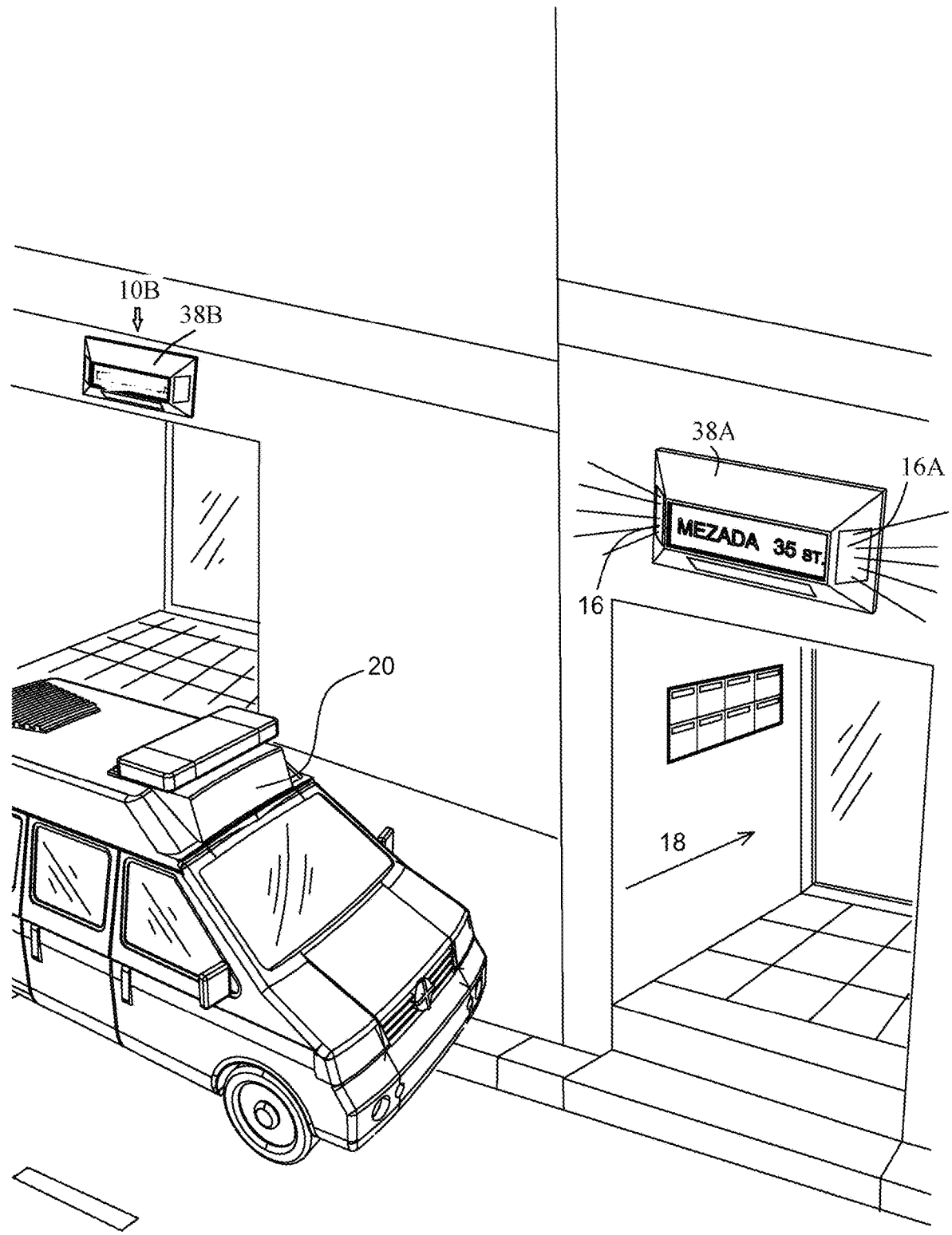
FIG. 2 depicts a typical installation of a primary apparatus of in accordance with an embodiment of the current invention.

In some embodiments based on a signal received from an apparatus, for example an identification number and/or signal strength, an appropriate entrance marking apparatus is selected and/or activated. at the second step, headquarters 22 communicates (24) SIM card 30A, and changes the status of a primary apparatus 10A to active. For example, primary apparatus 38A may be identified FIG. 2 depicts a typical installation of the primary apparatus of FIG. 1.

In some embodiments, a primary apparatus (e.g. 38A, 38B, etc.) is stationary, e.g. at a fixed location. For example, example each apparatus 38A, 38B may be located near a different physical location. Directions to a primary apparatus 38A, 38B may be supplied to a responder (e.g. a first responder i.e. an EMT) by a traffic navigation application, such as WAYZ or Google Earth navigation.

Primary apparatus 38A preferably includes visual/vocal/transmitting devices 16A, for presenting itself to the arriving ambulance 20, once having the active status. Optionally, an apparatus 38A and/or 38B marks an entrance to a building. In some embodiments, the appropriate entrance marking apparatus (e.g. 38A and/or 38B) is activated at an appropriate time. For example, the apparatus may be activated automatically at a fixed time after the emergency call. Alternatively or additionally, the apparatus (38A, 38B) may be activated by a timer which is set based on an ETA (estimated time of arrival) of a first responder. Alternatively or additionally, the apparatus may be activated automatically and/or by a command from a first responder when the first responder approaches the scene.

Figure 3:
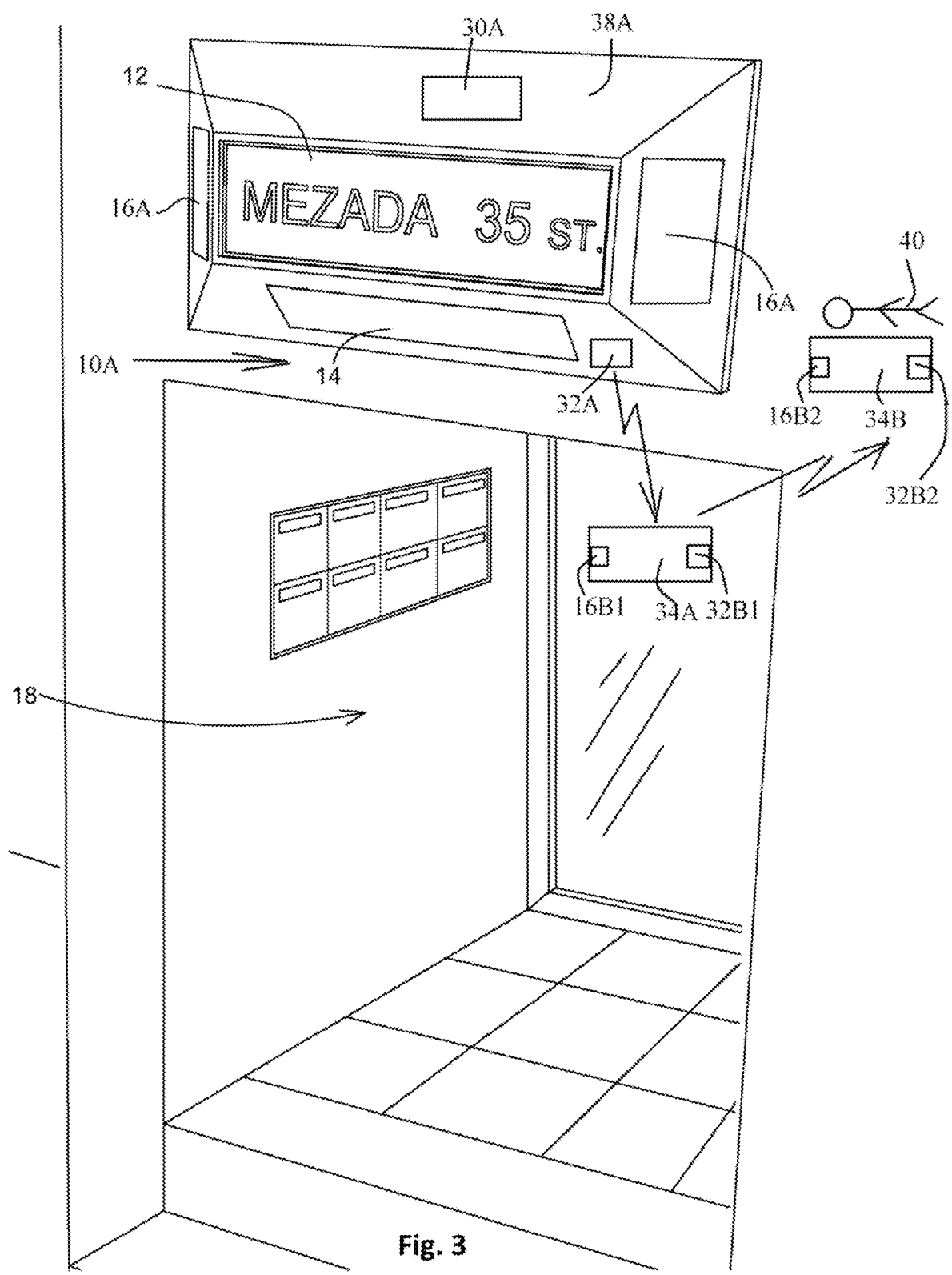
FIG. 3 depicts additional steps of using the emergency kit of in accordance with an embodiment of the current invention.

FIG. 3 depicts additional steps of using the emergency kit of FIG. 1.

Primary apparatus 38A further includes a short-range transceiver 32A, which transmits once the status of emergency apparatus 10A is active.

Emergency kit 10A may further include one or more secondary apparatuses 34A, 34B, etc., each including short-range transceiver 32A and visual/vocal/transmitting devices 16A.

Secondary apparatuses 38A, 38B, etc. are equal to one another and are not unique, as lacking SIM cards. Secondary apparatuses 38A, 38B, etc. are intended to be mobile, for being located one after the other as a function of the current event, for accompanying finding the patient 40.

According to the example of FIG. 3, secondary apparatus 38A is currently being disposed near primary apparatus 38A; and secondary apparatus 38B near and after secondary apparatus 38A, and near patient 40.

Primary apparatus 38A activates secondary apparatus 38A, and secondary apparatus 38A activates secondary apparatus 38B.

According to one example, the user establishing the event, may buy from a shop ten secondary apparatuses 38A, 38B, etc., not having any unique identity, and place them one after the other between primary apparatus 38A and the patient. Primary apparatus 38A may then blink, and may open gates, providing access to the patient. The crew finds primary apparatus 38A by a traffic navigation application. The crew then finds secondary 34A through primary apparatus 38A, then finds secondary 34B through secondary apparatus 38B, etc.

Thus, in one aspect, the invention is directed to an emergency kit (10A), including a first apparatus (38A) including:

a long-range communication device including a unique identity module (30A), for receiving (24) a status of the first apparatus (38A) from another long-range communication device (26B);

a visual/vocal/transmitting device (16A), for being turned on once the status is active, thereby the first apparatus (38A) indicates a first location of an emergency event setting the active status.

The emergency kit (10A) may further include a second apparatus (34A), including:

a first short-range transceiver (32B1), for receiving the status from the first apparatus (38A); and a visual/vocal/transmitting device (16B1), for being turned on once the status is active, thereby the second apparatus (34A) indicates a second location of the emergency event, being improved in relation to the first location, in being closer to patient 40.

The emergency kit (10A) may further include additional apparatuses (34B) for being disposed one after the other, each including:

a second short-range transceiver (32B2), for receiving the status from any of the apparatuses (38A, 34A); and a visual/vocal/transmitting device (16B2), for being turned on once the status is active, thereby the additional apparatuses (34B) indicate additional locations of the emergency event, being improved one in relation to the other.

The first apparatus (38A) may further include:

a third short-range transceiver (32A), for receiving the status from the unique identity module (30A), for transmitting the status to other apparatuses (34A).

The transmitting device may be configured to open (18) a gate.

Figure 4:
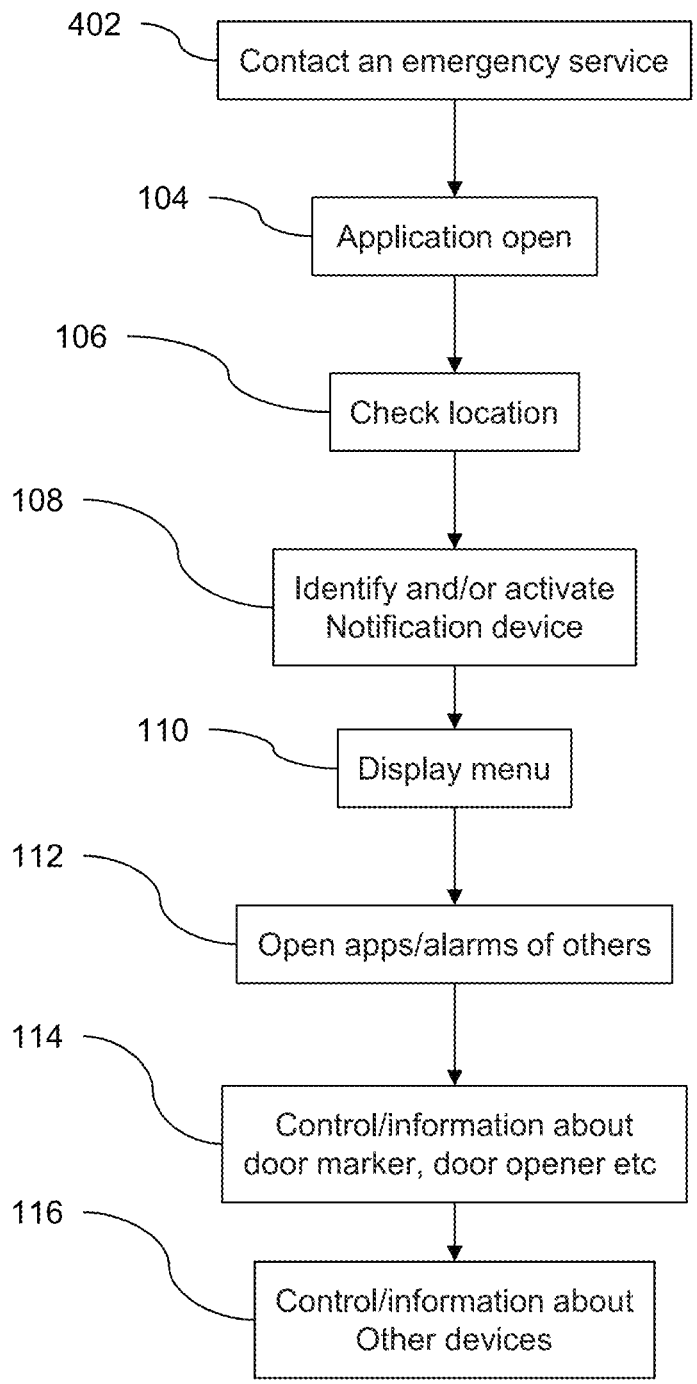
FIG. 4 is a flow chart illustration of a method of emergency notification in accordance with an embodiment of the current invention.

In the figures and/or description herein, the following reference numerals (Reference Signs List) have been mentioned:

numerals 10A and 10B denote emergency kits according to one embodiment of the invention, each disposed at a different location for directing the crew to a different location;

numeral 12 denotes a presented address, preferably to be reachable by traffic navigation application;

numeral 14 denotes a light source;

each of numerals 16A, 16B1 and 16B2 denotes visual/vocal/transmitting devices;

numeral 18 denotes opening of the gate, which may be applied by transmittance;

numeral 22 denote the headquarters;

numeral 26A denotes the phone of a person reporting the event;

numeral 20 denotes the crew's ambulance;

numeral 26B denotes the long-range communication device such as a phone of headquarters 22;

numeral 30A denotes a unique identity module, such as a SIM card;

numerals 32A, 32B1 and 32B2 denote short-range transceivers;

numerals 34A, 34B, etc. denote the secondary apparatuses of emergency kits 10A, 10B, etc.;

numerals 38A, 38B, etc. denote the primary apparatuses of emergency kits 10A, 10B, etc. respectively;

numeral 40 denotes a patient;

FIG. 4 is a flow chart illustration of a method of emergency notification in accordance with an embodiment of the current invention. In some embodiments, an emergency notification application is automatically activated when a caller contacts 102 an emergency service. For example, a contacting 102 an emergency service may include calling an emergency number such as 911 on a smartphone. Optionally, the contacting 102 may cause an application to open 104 on the smart phone. Alternatively or additionally, an emergency notification application may open 104 on a computing device of an emergency dispatcher, for example, when he receives a call. Alternatively or additionally, an emergency notification application may open 104 on a computing device of an emergency responder, for example, when he responds to a call. Alternatively or additionally, a user may contact an emergency service 102 by opening 104 the emergency notification application directly. For example, the application may be opened 104 along with calling an emergency number and/or in place of calling the emergency number. Alternatively or additionally, an emergency application may be opened in response to an alarm system. For example, when a fire alarm is set off in a building, an emergency application may automatically be activated 102 on a tenant's cell phone. Alternatively or additionally, when a fire alarm is set off in a building, the emergency application may automatically be activated 102 on a superintendent's computing device. Optionally, the computing device and/or cell phone may check a current location 106 and/or open 104 an appropriate version of the application dependent on a current location of the phone (if the phone is within a small range of the building an emergency escape application may be opened 104 and/or when the phone is a large distance from the building, a remote response application may be opened.

In some embodiments, an emergency notification application may check 106 a current location of the communication device. For example, the device may include a stored identification number of a home notification apparatus. Before activating 108 the home apparatus and/or sending the identification number of the home apparatus to an emergency dispatcher, an application may check 106 the current location of the communication device. If the location is within a range of home (e.g. within 10 m and/or within 50 m and/or within 100m) then then the home apparatus may be activated 108 and/or identified. If the current location is further than the range, then the home apparatus may not be identified and/or activated 108. Alternatively or additionally, a user's smart phone may include numbers of a few notification apparatuses (for example, a number of an apparatus of the user's home, his mother's home, his work etc.) the smart phone may automatically identify and/or activate 108 appropriate notification apparatus based on the current location of the calling device. For example, when a user makes an emergency call in range of his apartment, the smart phone may identify and/or activate 108 the user's home notification apparatuses. If the current location is in range of the mother's apartment, the smart phone may identify and/or activate 108 the mother's notification apparatus. Alternatively or additionally, the application may prompt a user and/or allow a user to override an automatic identification and/or activation 108 of an apparatus. Alternatively or additionally, a user may manually identify and/or activate 108 an emergency notification apparatus to the application and/or an emergency dispatcher. Alternatively or additionally an emergency dispatcher may identify and/or activate a notification apparatus based on a caller's phone number and/or other information. For example, the dispatcher may have access to a database that connects notification apparatus identification numbers with an address specified by a caller and/or current locations of his communication device and/or the number of the caller. Alternatively or additionally, an emergency notification apparatus may include a local transmitter that broadcasts a beacon signal which received by the caller's communication device. In some embodiments, the beacon signal includes an identification number. Optionally, the communication device includes an application (for example that automatically opens when an emergency call is made). Optionally, the application seeks appropriate notification apparatus signals and/or identifies the nearest notification apparatus and/or sends identification of the apparatus to a dispatcher and/or activates 108 the apparatus. Alternatively or additionally, there may be multiple beacon signals that are received by the user's communication device, optionally the communication device will identify correct apparatus from the available signals and/or their respective signal strengths.

In some embodiments, an emergency notification application may display 110 a user menu. For example, when a user calls an emergency number, a menu may pop up (and/or may be given over audio and/or in another way). For example, the menu may display an automatic device activation scheme and/or allow the user to disable default actions and/or allow the user to activate an apparatus to take an action. For example, the application may allow the user to activate and/or deactivate various notification apparatuses and/or open and/or close doors etc. etc. In some embodiments, menu options may be customized based on location, stored data and/or time.

In some embodiments, an emergency notification application may be employed to control various notification apparatuses. For example, a notification application may activate a notification marker that signals an entrance to a building that will lead to an apartment where an emergency is occurring. For example, a notification application may activate an apparatus opening a door allowing access to first responders. Optionally, when an emergency call is made, a notification application may open up 112 on multiple computing devices. Optionally, control will be shared over various notification apparatuses. In some embodiments, security officials, emergency personnel, caretakers, significant others and/or people with local responsibilities (such as a building superintendent) will be informed and/or given control over notification apparatuses. For example, when an elderly resident of a building calls 911, an application will open on her smart phone, on her daughter's smart phone, on a computing device of an emergency dispatcher, on a device of the caller's personal physician, on a computing device of a building security agency, on a computing device of a building superintendent, on a computing device of a neighbor of the caller and/or on a control center of the notification apparatus network. Optionally, when a first responder responds to the call, an application may opened on his computing device. For example, each of the above users of the system may be given personalized information and/or control 114 over various notification apparatuses (e.g. opening doors, marking entrances etc.). Optionally, the application will inform users which notification apparatuses are related to the call and/or which have been activated and/or which have not been activated and/or what triggered the activation (e.g. was an apparatus activated automatically and/or which user activated the apparatus). Optionally, some users may be given access to data from local sensors (e.g. security cameras, smoke alarms) and/or may be presented with a map of the building where the event is occurring. For example, each user may be given personalized information about and/or location of and/or control 116 over significant objects such as sensors, the communication device which made the call, fire doors, sprinklers, ventilators may be supplied by the application. Other information may also be presented. For example, an emergency responder may be warned that there is a guard dog in the vicinity and/or that the caller and/or a neighbor have a significant medical condition. Other controls may also be offered, for example, over lights, electrical power etc. around the sight of an emergency.

Figure 5:
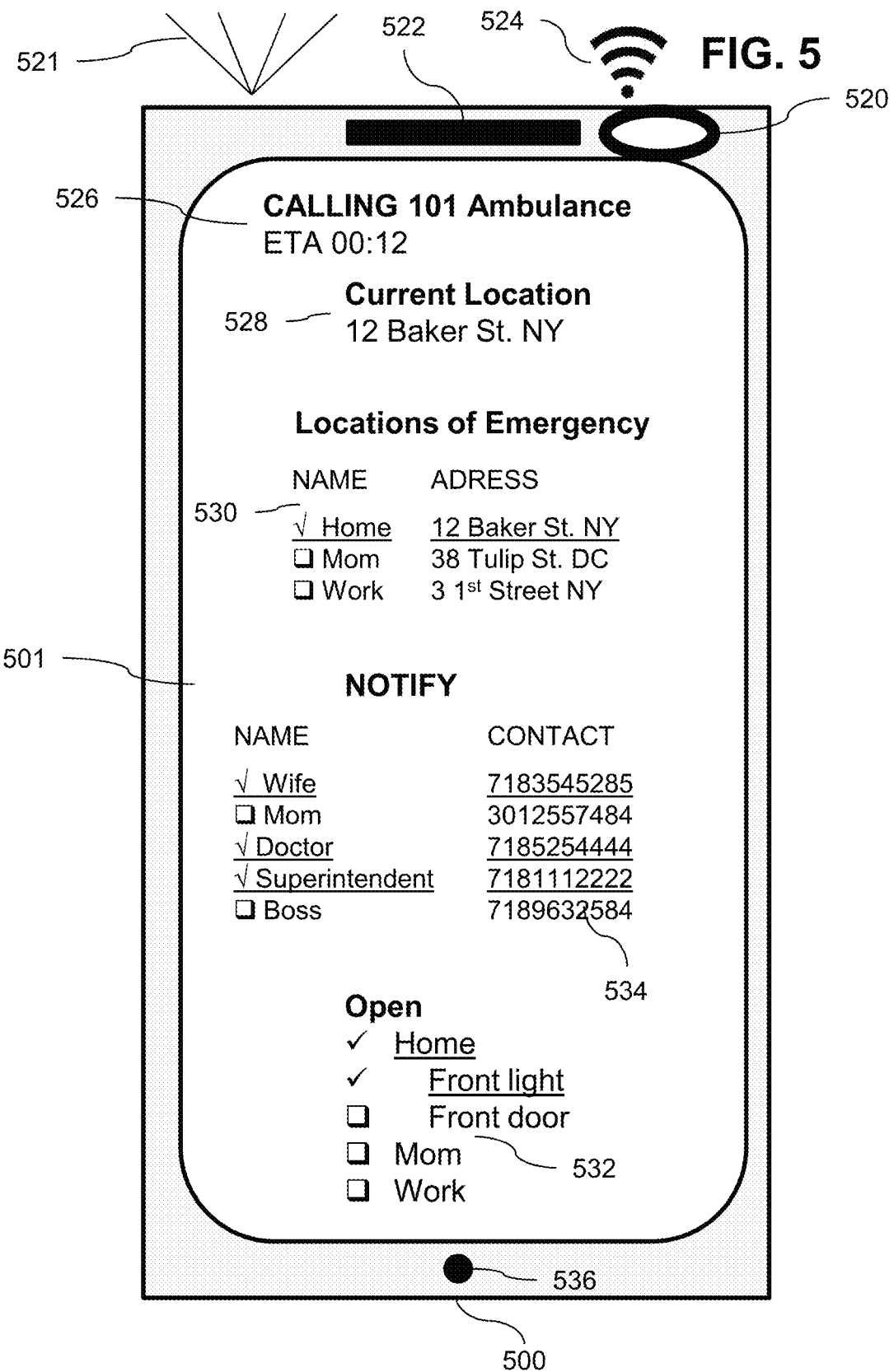
FIG. 5 is a screen shot of an emergency notification user application in accordance with an embodiment of the current invention.

FIG. 5 is a screen shot of an emergency notification user application in accordance with an embodiment of the current invention. When an emergency is detected (e.g. an emergency call is made and/or an alarm is triggered) an application may open on a computing device 500 giving information and/or control over the situation. For example, FIG. 5 illustrates an exemplary application display on a communication device 500 (e.g. a smartphone) that was used to make an emergency call. The application may coordinate information sharing and/or control of emergency notification apparatuses and/or other equipment at the scene.

In some embodiments, the application may activate various parts of communication device 500 and/or place parts of the device 500 into local and/or remote control. For example, a camera 520 of the device 500 may be used to send images of the user and/or the surroundings to an emergency dispatcher. Optionally, sensors of the device may be used to verify a callers identity. For example a microphone may be used for voice recognition and/or a camera may be used for face recognition and/or fingerprint reader may be used to verify the caller's identity (e.g. to avoid false calls). Optionally a light 521 of the device 500 will be activated and/or made to blink to make it easy for emergency responders to find the victim. Optionally a speaker 522 of the device 500 will be given into control of dispatcher and/or a control center. Optionally, the speaker 522 may be used to give instructions to the victim and/or to a caller who is trying to give assistance. Alternatively or additionally, the speaker 522 may be used as an alarm to help emergency personnel find and/or identify the victim. Optionally a wireless communication port 524 (e.g. Bluetooth, IR, etc.) will be used by the application, for example to communicate directly with an emergency notification apparatus (for example to activate an entrance marking apparatus and/or a door opening apparatus). Alternatively or additionally, the local wireless communication port may be used to receive data and/or location information from an emergency notification apparatus (for example to identify the apparatuses). Alternatively or additionally, a location sensor (for example a GPS sensor and/or accelerometer) may be used to locate the communication device 500 and/or movements thereof.

In some embodiments, the emergency notification application will present to a user emergency information. For example, the application may receive updates of the Internet of emergency responders and/or their locations and/or present that information and/or an expected time of arrival 526 (ETA) to the user. For example, the application may track the location 528 of the responders and/or the caller. Optionally, the application will give a menu of locations 530 where the caller is often found and/or where people connected to the caller live. Thus, if the emergency is in one of those locations, the user can quickly give an accurate location to emergency responders. Alternatively or additionally, a menu 532 may open listing locations where the caller has control of emergency notification apparatuses. For example, menu 532 may be used by the caller to activate and/or deactivate emergency notification and/or other apparatuses.

In some embodiments, a list is presented of people who might be contacted and/or informed about the emergency. For example, the user may contact these people. Optionally, selecting a person on the list cause an emergency notification to open on a device of one of the contacts, giving him information and/or control over apparatuses in the vicinity of the emergency situation. Alternatively or additionally, a text (e.g. an SMS message, a message over a social network and/or email), and/or an audio message and/or picture will be sent.

In some embodiments, a microphone 536 of the communication device 500 may be used to communicate with emergency and/or medical and/or supervisory personal.

Figure 6:
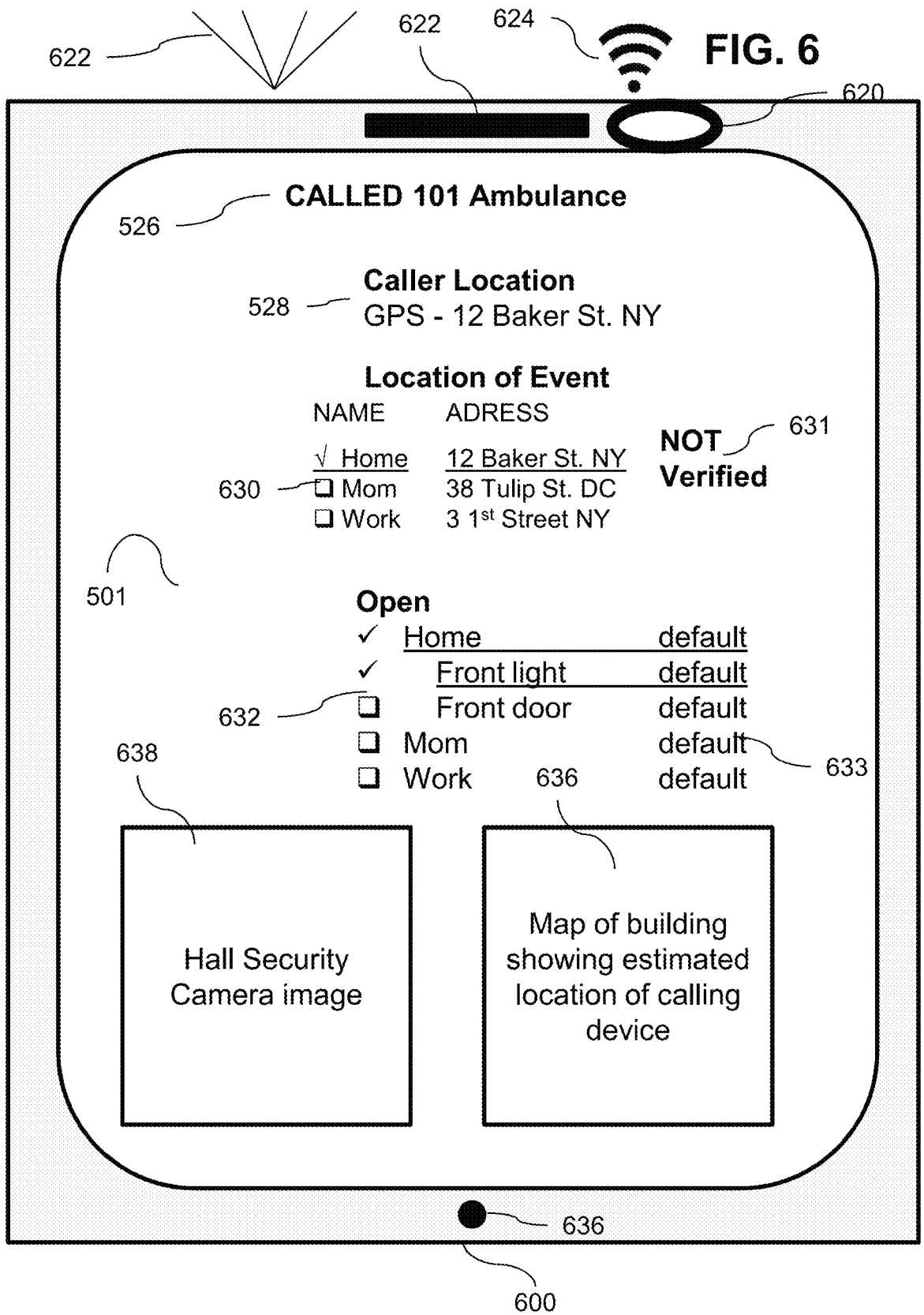
FIG. 6 is a screen shot of an emergency notification responder application in accordance with an embodiment of the current invention.

FIG. 6 is a screen shot of an emergency notification responder application in accordance with an embodiment of the current invention. In some embodiments, an application may open and on a computing device 600 of emergency personnel. The application may be coordinated with applications on other devices. For example, an emergency responder may be given information about the caller and/or the event and/or conditions in the vicinity of the event. Alternatively or additionally, an emergency responder may be given control over conditions in the vicinity of the event. Alternatively or additionally, the application may serve for communication between emergency responders, people at the event, other involved individuals and/or dispatchers. In some embodiments, device 600 and/or the application thereon may be used by a caretaker of an emergency victim and/or a superintendent at a building where an emergency is occurring and/or a emergency dispatcher and/or in a call center supervising the emergency application and/or a security organization responsible for security at a site where there are automatic door opening devices.

In some embodiments, device 600 displays the kind of communication that initiated the emergency call. Optionally, the location 528 from with the call was made is displayed. In some embodiments, the reckoned location 630 of the event is displayed. Optionally, along with the reckoned location, in some embodiments alternative locations 630 are displayed and/or an indicator 631 of how sure is the identification of the location. For example, the application may display whether the caller verified the location for example, by selecting and/or checking the location on the application running on his device. In some embodiments, a list 632 of emergency notification apparatuses are displayed. Optionally, along with the list of apparatuses, it may be displayed who activated which apparatus.

In some embodiments, further information may be made available over device 600. For example, a map 636 may be displayed. For example, the map 636 may include directions to a building of an emergency event and/or directions to the proper entrance to the building and/or directions within the building to the location of the event. Alternatively or additionally an image 638 and/or a video image may be shown from a security camera in the vicinity of the event and/or from a camera of a phone of another user of the application (for example camera 520 of the caller who reported the emergency).

In some embodiments a responder device may include a microphone 636, a light 621, a speaker 622, a camera 620 and/or a wireless communication device 624. For example, the wireless communication device 624 may be used for communication with an emergency notification apparatus (e.g. to get information and/or to activate and/or to deactivate). For example, camera 620 and/or microphone 636 may be used to keep a dispatcher informed of what is going on at an emergency scene.

Figure 7:
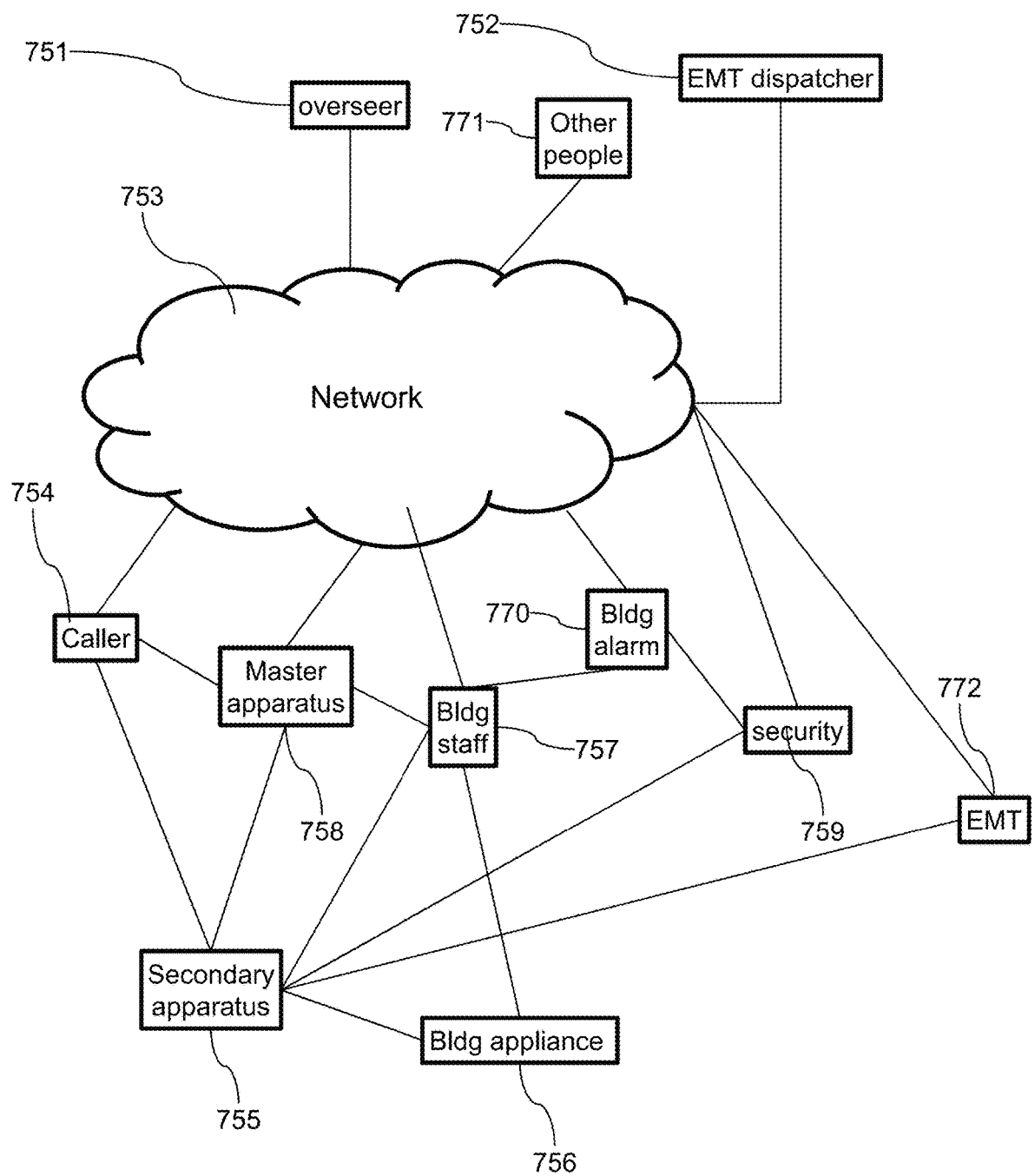
FIG. 7 is a block diagram of an emergency notification system in accordance with an embodiment of the current invention.

FIG. 7 is a block diagram of an emergency notification system in accordance with an embodiment of the current invention. In some embodiments, a caller 754 who reports an emergency incident has an application on his computing device that connects coordinates information and control between various apparatuses and/or actors. For example, the system may be managed by an overseer 751. Optionally, integrated applications open on devices of one or more of the callers 754, another individual (e.g. family member, caretaker), an emergency responder 772 (e.g. an EMT), staff 757 of the building or area of the emergency, and/or security personnel 748 (e.g. police, a security service, a private security guard). Optionally, a responder and/or dispatcher will be notified of possible important conditions at a location where an emergency is occurring and/or nearby. For example, in the case of a fire, responders may be warned that a resident of a certain apartment in the building has an dangerous and/or explosive object (e.g. an oxygen tank) and/or that a resident of a certain apartment has a breathing condition (e.g. asthma, emphysema, a heart condition, lung cancer) and may be highly susceptible to suffocation due to smoke and/or a disability requiring special evacuation assistance. A message to responders may give a lists of emergency equipment available in the vicinity and/or of medical conditions of people who are potentially involved in the emergency.

In some embodiments, a shared application may direct control by a group of individuals over to various appliances. Optionally, the system may control one or more emergency notification apparatuses. For example, there may be one or more master apparatuses 758 that are controllable through a network 753 and/or from a large distance. For example, network 753 may include a public network, for example the Internet. For example, there may be one or more secondary apparatuses 755 that are controlled via a master apparatus 758 and/or locally using a wireless connection (for example, a caller 754 may have control of one or more devices in his home building and/or a security organization 759). For example, a master apparatus 758 may include an entrance marker and/or a door opener and/or a secondary apparatus 758 may include an entrance marker and/or a door opener. Optionally other appliances 756 may be controlled and/or coordinated. For example, other appliances may include parts of a building electrical system and/or a sprinkler system and/or a loudspeaker system and/or a valve, for example a gas valve and/or a water valve. Optionally, a building alarm 770 may also be integrated into the system. In some embodiments, a master apparatus 758 may control personal devices of a building tenant. For example, a tenant with a heart condition may connect his electronic door lock to the master apparatus 758. For example, when an emergency responder responds to a call to the tenant's address, he may be supplied with a link to unlock the door of the apartment. Various "smart" appliances may be accessible to emergency personnel, for example a stove and/or indoor lights and/or outdoor lights and/or a climate control system.

In some embodiments, a single master apparatus 758 may include a large number of secondary apparatuses 755 in the same building and/or in other buildings. Optionally, a user may access one or another of the master apparatuses and/or secondary apparatuses separately or together.

Figure 8:
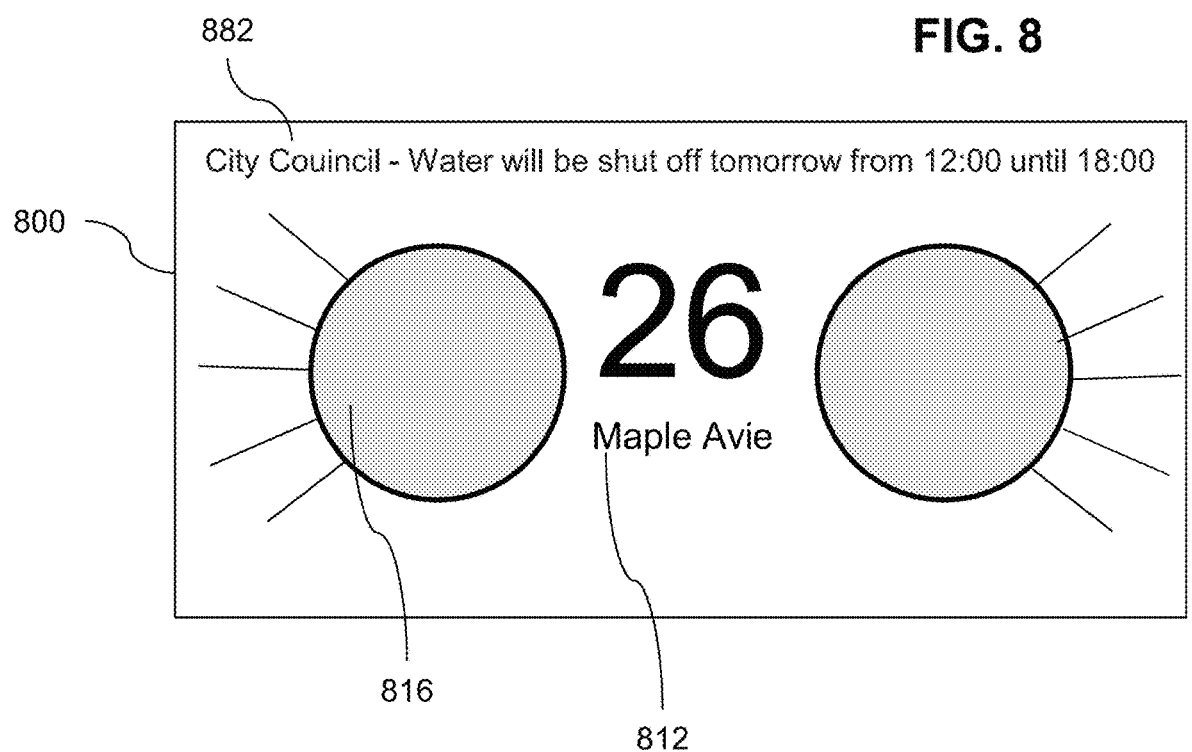
FIG. 8 is a schematic illustration of an emergency sign in accordance with an embodiment of the current invention.

FIG. 8 is a schematic illustration of an emergency sign 800 in accordance with an embodiment of the current invention. In some embodiments a sign may include an emergency symbol, for example a flashing patch of light 816. Optionally the lights will flash in a color and/or pattern that will tell emergency personnel what kind of emergency is occurring (e.g. fast red flashing for medical emergency, flashing blue for police call, slow red flashing for fire etc.). Optionally, an emergency sign 800 may include a large clear address marker 812. Optionally, the address marker 812 will be obvious and easy to read day or night (for example, it may include a LED visible at night and/or be shaded and/or include an LCD that is obvious during the day and/or the LED may be strong enough to be clearly visible in the day). Optionally, a sign 800 may include a message area 882. For example, the message area may be used for non-emergency local information (for example announcements from the local government). In some embodiments, the message area may be used for emergency information (for example in the case on an earthquake the sign may give information as to where to seek shelter and/or in the case of an air raid event the message area may give instructions to during an air raid event to reach a shielded portion of the building. The message 882 may give information for emergency personnel (for example where is the emergency kit in the building and/or what kind of equipment is available). In some embodiments a verbal message may also be broadcast by a loudspeaker In some embodiments a sign may be embodied entirely as a single unit (for example a LED electronic screen include a message and/or a picture of a flashing alarm light) and/or it may include separate parts (e.g such as an LED electronic screen message area and/or a separate flashing alarm light etc.). Optionally a sign 800 may be angled to be visible when a vehicle approaches the house from a main street and/or a sign 800 may be shaped to be visible from multiple directions.

The foregoing description and illustrations of the embodiments of the invention have been presented for the purpose of illustration, and are not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

It is expected that during the life of a patent maturing from this application many relevant technologies will be developed and the scope of the terms is intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An emergency kit (10A), comprising:
    a mobile phone (26A) configured to report an identity of a unique identity module (30A) when said mobile phone (26A) is used to request an ambulance service; and
    a first apparatus (38A) including:
        a long-range communication device comprising said unique identity module (30A), for receiving (24) a communication from another long-range communication device (26B) and changing a status of said first apparatus (38A) to an active status in response to said communication; and
        a first member (16A), comprising at least one member selected from a group consisting of a visual, vocal and transmitting device, for being turned on in response to said changing of said status of said first apparatus (38A) to said active status in response to said communication,
        thereby indicating a first location of an emergency event; and
    at least a second apparatus (34A), including:
        a first short-range transceiver (32B1), for receiving said status from said first apparatus (38A); and
        a second member (16B1), comprising at least one member selected from a group consisting of a visual, vocal and transmitting device, for being turned on once said status is active,
    thereby said second apparatus (34A) indicates a second location of said emergency event, being improved in relation to said first location.

2. An emergency kit (10A) according to claim 1, wherein said emergency kit (10A) further comprises at least a third apparatus (34B), comprising:
    a second short-range transceiver (32B2), for receiving said status from any of said first apparatus, said second apparatus and said third apparatus (38A, 34A); and
    a third member (16B2), comprising at least one member selected from a group consisting of a visual, vocal and transmitting device, for being turned on once said status is active,
    thereby said at least third apparatus (34B) indicates at least a third location of said emergency event, being improved in relation to any of said locations.

3. An emergency kit (10A) according to claim 1, wherein said first apparatus (38A) further comprises:
    a third short-range transceiver (32A), for receiving said status from said unique identity module (30A), for transmitting said status to other apparatuses (34A).

4. An emergency kit (10A) according to claim 1, wherein said transmitting device is configured to open (18) a gate.

5. An emergency kit (10A) according to claim 4, wherein said gate includes parking gate.

6. The emergency kit (10A) of claim 1, wherein said first apparatus is configured for facilitating access of an emergency responder to a location of the first apparatus.

7. The emergency kit (10A) of claim 1, wherein said mobile phone includes a caller application configured for displaying a menu of control options for a plurality of said first apparatus.

8. The emergency kit (10A) of claim 7, further comprising:
a responder communication device configured to open a responder application coordinated to said caller application for displaying on said responder communication device an indicator of a status of said first apparatus.

9. The emergency kit (10A) of claim 8, wherein said responder application is further configured for displaying on said responder communication device a menu of control options for a plurality of said first apparatus.

10. The emergency kit (10A) of claim 8, wherein said caller application is further configured for presenting a menu for verifying a location of an emergency event.

11. The emergency kit (10A) of claim 10, further comprising:
a responder communication device configured to open a responder application coordinated to said caller application for displaying on said responder communication device an indicator of a status of said verification.

12. The emergency kit (10A) of claim 1, wherein said mobile phone includes a caller application configured for presenting a menu for verifying a location of an emergency event.

13. The mobile phone includes a of claim 12, further comprising:
a responder communication device configured to open a responder application coordinated to said caller application for displaying on said responder communication device an indicator of a status of said verification.

14. An emergency kit (10A) according to claim 1, wherein said mobile phone is further configured to report said unique identity module (30A) to said long range communication device (26B).

* * * * *